(12) United States Patent
Liu et al.

(10) Patent No.: US 11,283,116 B2
(45) Date of Patent: Mar. 22, 2022

(54) BATTERY HEATING SYSTEM AND METHOD (71) Applicant: Contemporary Amperex Technology Co., Limited, Ningde (CN)

(72) Inventors: Yu Liu, Ningde (CN); Jinglin Li, Ningde (CN); Qiandeng Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/965,414

(22) PCT Filed: Nov. 29, 2019

(86) PCT No.: PCT/CN2019/122121
§ 371 (c)(1),
(2) Date: Jul. 28, 2020

(87) PCT Pub. No.: WO2020/108633
PCT Pub. Date: Jun. 4, 2020

(65) Prior Publication Data
US 2021/0036388 A1 Feb. 4, 2021

(30) Foreign Application Priority Data

Nov. 30, 2018 (CN) .......................... 201811457395.2

(51) Int. Cl.
*H01M 10/633* (2014.01)
*H01M 10/615* (2014.01)
(52) U.S. Cl.
CPC ....... *H01M 10/633* (2015.04); *H01M 10/615* (2015.04)

(58) Field of Classification Search
CPC combination set(s) only.
See application file for complete search history.

(56) References Cited

U.S. PATENT DOCUMENTS

2007/0212598 A1* 9/2007 Iida .................... H01M 10/486
429/62
2010/0191398 A1* 7/2010 Hirota ................ H01M 10/486
701/22

(Continued)

FOREIGN PATENT DOCUMENTS

CN 103419650 A 12/2013
CN 103419663 A 12/2013

(Continued)

OTHER PUBLICATIONS

The Second Office Action for Chinese Division Application No. 202011435681.6, dated Feb. 7, 2022, 8 pages.

(Continued)

*Primary Examiner* — Kaity V Chandler
(74) *Attorney, Agent, or Firm* — Law Offices of Liaoteng Wang (57) ABSTRACT

The embodiments of the present disclosure disclose a battery heating system and method, and relate to the field of batteries. The battery heating system may include: a temperature sampling module configured to collect a target sampling temperature; a control module configured to control a heating module to enter a first heating mode when the target sampling temperature is not lower than a preset expected heating temperature; the heating module configured to enter the first heating mode to intermittently heat the battery module set by using a first portion of external electric energy, so as to maintain the target sampling temperature at the preset expected heating temperature.

13 Claims, 5 Drawing Sheets

(56) References Cited

U.S. PATENT DOCUMENTS

| | | | | |
|---|---|---|---|---|
| 2013/0033790 A1* | 2/2013 | Kobayakawa | ........... | G01K 7/42 |
| | | | | 361/87 |
| 2013/0093399 A1* | 4/2013 | Svensson | ............ | H01M 10/443 |
| | | | | 320/150 |
| 2015/0018199 A1* | 1/2015 | Ma | ............................ | B01J 37/30 |
| | | | | 502/185 |
| 2015/0188199 A1 | 7/2015 | Lee et al. | | |
| 2016/0190661 A1* | 6/2016 | Kuruma | ............... | H01M 10/486 |
| | | | | 701/36 |
| 2017/0256832 A1* | 9/2017 | Li | ........................ | H01M 10/486 |
| 2018/0072183 A1* | 3/2018 | Nomura | ................. | H01M 10/46 |
| 2018/0093583 A1* | 4/2018 | Kim | ..................... | H01M 10/486 |
| 2018/0358829 A1* | 12/2018 | Rastegar | ................. | H01G 11/54 |
| 2019/0363563 A1* | 11/2019 | Zhang | .................. | H01M 10/637 |

FOREIGN PATENT DOCUMENTS

| | | | | | |
|---|---|---|---|---|---|
| CN | 103419666 | A | | 12/2013 | |
| CN | 104393368 | A | | 3/2015 | |
| CN | 104723893 | A | | 6/2015 | |
| CN | 105093099 | A | | 11/2015 | |
| CN | 105190987 | A | | 12/2015 | |
| CN | 105207295 | A | | 12/2016 | |
| CN | 106207295 | A | | 12/2016 | |
| CN | 106532187 | A | | 3/2017 | |
| CN | 106785120 | A | * | 5/2017 | |
| CN | 106848486 | A | | 6/2017 | |
| CN | 107317066 | A | * | 11/2017 | ........... H01M 10/625 |
| CN | 107317066-A TR | | * | 11/2017 | ........... H01M 10/615 |
| CN | 207134449 | U | * | 3/2018 | |
| CN | 107878234 | A | | 4/2018 | |
| CN | 107919506 | A | | 4/2018 | |
| CN | 108365141 | A | * | 8/2018 | |
| CN | 108501746 | A | * | 9/2018 | |
| CN | 108520993 | A | * | 9/2018 | |
| CN | 108574319 | A | * | 9/2018 | .............. H02J 7/007 |
| CN | 108717986 | A | | 10/2018 | |
| JP | 2018037193 | A | * | 3/2018 | |
| RU | 2014151873 | A | | 7/2016 | |
| WO | WO-2018230812 | A1 | * | 12/2018 | ........... H01M 50/20 |

OTHER PUBLICATIONS

The First Office Action for Chinese Division Application No. 202011435681.6, dated Sep. 18, 2021, 13 pages.

The First Office Action for China Division Application No. 202011435681.6, dated Sep. 18, 2021, 8 pages.

The extended European search report for EP Application No. 19891481.4, dated Feb. 24, 2021, 41 pages.

The International search report for PCT Application No. PCT/CN2019/122121, dated Mar. 6, 2020, 12 pages.

The First Office Action for Chinese Application No. 201811457395.2, dated Jul. 23, 2020, 8 pages.

The Notice of Allowance and supplementary search report for Chinese Application No. 201811457395.2, dated Nov. 4, 2020, 7 pages.

* cited by examiner

BATTERY HEATING SYSTEM AND METHOD

CROSS-REFERENCE TO RELATED APPLICATION

The present application is a National Stage of International Application No. PCT/CN2019/122121 filed on Nov. 29, 2019, which based on and claims priority to Chinese Patent Application No. 201811457395.2 filed on Nov. 30, 2018, which is incorporated herein by reference in its entirety.

TECHNICAL FIELD

The present disclosure relates to the field of batteries, and in particular, to a battery heating system and method.

BACKGROUND

With development of new energy vehicles, batteries that power the new energy vehicles may be applied in various fields. With the widespread application of batteries, battery performance issues have attracted widespread attention from consumers and businesses.

Since an internal resistance of a battery will increase sharply as the temperature decreases, a capacity of the battery will decrease rapidly as the temperature decreases. When using an external charging device to charge the battery, if an ambient temperature of the battery is low, the actual capacity of the battery may be much lower than the theoretical capacity of the battery, which reduces utilization of the battery capacity. In order to ensure high utilization of the battery capacity, when the temperature of the battery is low, the battery needs to be heated, especially during a low-temperature parking and charging process.

SUMMARY

Embodiments of the present disclosure provide a battery heating system and method which may improve a utilization rate of battery capacity.

In one aspect, an embodiment of the present disclosure provides a battery heating system, including: a temperature sampling module configured to collect a target sampling temperature, wherein the target sampling temperature may include a real-time temperature of a battery module set or a real-time temperature of an external environment of a battery pack to which the battery module set belongs, the battery module set may include N battery modules, and N may be a positive integer; a control module configured to control a heating module to enter a first heating mode when the target sampling temperature is not lower than a preset expected heating temperature; the heating module configured to enter the first heating mode to intermittently heat the battery module set by using external electric energy, so as to maintain the target sampling temperature at the preset expected heating temperature.

In another aspect, an embodiment of the present disclosure provides a battery heating method, including: receiving the target sampling temperature collected by the temperature sampling module; controlling the heating module to enter the first heating mode when the target sampling temperature is not lower than the preset expected heating temperature, so as to maintain the target sampling temperature at the preset expected heating temperature, wherein the first heating mode may include intermittently heating the battery module set by using the external electric energy.

According to the battery heating system and method in the embodiments of the present disclosure, compared to a case where the collected target sampling temperature is not lower than the preset expected heating temperature, when the collected target sampling temperature is lower than the preset expected heating temperature, the capacity utilization rate of the battery capacity may be lower. Therefore, when the target sampling temperature is not lower than the expected heating temperature, a portion of the output electric energy of the external charging device may be used to intermittently heat the battery module set to maintain the target sampling temperature at the preset expected heating temperature. The target sampling temperature is the real-time temperature of the battery module set or the real-time temperature of the external environment of the battery pack to which the battery module set belongs. When the target sampling temperature is maintained at a preset expected heating temperature, the capacity utilization rate of the battery capacity may be high. Therefore, the embodiments of the present disclosure may improve the utilization rate of the battery capacity.

BRIEF DESCRIPTION OF THE DRAWINGS

In order to more clearly illustrate technical solutions of the embodiments of the present disclosure, drawings used in the embodiments of the present disclosure will be briefly described below. For those skilled in the art, other drawings may be obtained from these figures without any creative work.

DETAILED DESCRIPTION

Features and exemplary embodiments in various aspects of the present disclosure will be described in detail. The present disclosure will be further described in detail below with reference to the accompanying drawings and embodiments, to make the purposes, the technical solutions, and the advantages clearer. It is understood that the specific embodiments described herein are only to be construed as illustrative and not limiting. The present disclosure may be practiced without some of the details of these specific details, as would be understood by the skilled in the art. The following description of the embodiments is merely intended to provide a better understanding of the disclosure by illustration of examples of the present disclosure.

It should be noted that, in this context, relationship terms such as first and second are used merely to distinguish one entity or operation from another entity or operation, and do not necessarily require or imply that there is any such an actual relationship or order between such entities or operations. Furthermore, the term "comprise" or "include" or any other variations thereof is intended to encompass a non-exclusive inclusion, such that a process, method, article, or device that comprises a plurality of elements includes not only those elements but also other elements that are not listed exactly, or elements that are inherent to such a process, method, article, or device. An element that is defined by the phrase "comprising", without limiting the disclosure, does not exclude the presence of additional elements in the process, method, article, or device.

A battery pack may include multiple battery modules connected in series, in parallel, or both. The multiple battery modules in the battery pack may be referred to as a battery module set, and each battery module may include multiple battery cells.

The embodiments of the present disclosure provide a battery heating system and method, which can be applied to a scenario of low-temperature parking. In the battery heating system, a heating module may use entire output electric energy of an external charging device to continuously heat the battery module set. In the embodiment of the present disclosure, when a target sampling temperature collected by a temperature sampling module is not lower than a preset expected heating temperature, a control module may control the heating module to use a portion of the output electric energy of the external charging device to intermittently heat the battery module set, so as to maintain the target sampling temperature at the preset expected heating temperature.

Since the target sampling temperature is a real-time temperature of the battery module set or a real-time temperature of an external environment of the battery pack to which the battery module set belongs, in the embodiments of the present disclosure, according to a relationship between the target sampling temperature and the preset expected heating temperature, or a relationship between the temperature of the external environment of the battery pack to which the battery module set belongs and the preset expected heating temperature, a portion of the output electric energy of the external charging device may be selected to intermittently heat the battery module set to maintain the target sampling temperature at the preset expected heating temperature, so as to improve the utilization rate of the battery capacity.

It should be noted that the battery capacity in the embodiments of the present disclosure may refer to a capacity of the battery cell included in the battery module. The battery module is a battery module included in the battery module set. The utilization rate of battery capacity may be understood as a ratio of an actual capacity of the battery to a theoretical capacity of the battery.

Figure 1:
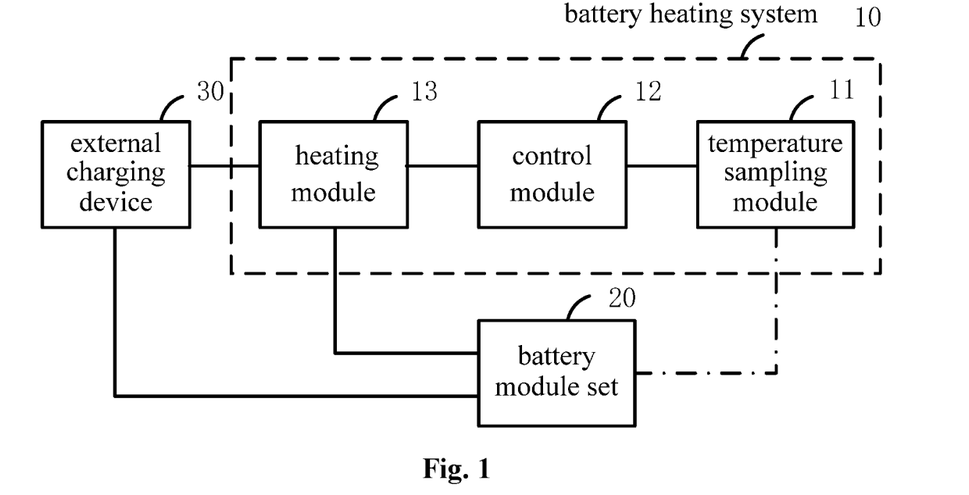
FIG. 1 is a schematic structural diagram of a battery heating system according to an embodiment of the present disclosure.

FIG. 1 is a schematic structural diagram of a battery heating system according to an embodiment of the present disclosure.

As shown in FIG. 1, the battery heating system 10 may include a temperature sampling module 11, a control module 12, and a heating module 13.

The temperature sampling module 11 may be configured to collect a target sampling temperature. The target sampling temperature may include: a real-time temperature of one battery module in a battery module set 20, an average real-time temperature of multiple battery modules in the battery module set 20, an internal temperature of a battery pack to which the battery module set 20 belongs, a temperature of a shell of the battery pack to which the battery module set 20 belongs, or a real-time temperature of an external environment of the battery pack to which the battery module set 20 belongs. The battery module set 20 may include N battery modules, where N is a positive integer.

In some embodiments of the present disclosure, when the real-time temperature of the battery module set 20 is required to be collected as the target sampling temperature, the dot-dash line in FIG. 1 indicates that the temperature sampling module 11 may collect the target sampling temperature from the battery module set 20. Specifically, a temperature sampling unit may be provided for each of the N battery modules included in the battery module set 20. Specifically, each temperature sampling unit may collect the real-time temperature of each battery cell included in the corresponding battery module.

Exemplarily, if a battery module includes i battery cells, the temperature sampling unit corresponding to the battery module may collect a total of i pieces of real-time temperature data, T1, T2, . . . , Ti. In this example, one of the collected i pieces of real-time temperature data with minimum value may be used as the real-time temperature of the battery module, where i is a positive integer.

Accordingly, in this example, a minimum real-time temperature value may be selected from the real-time temperatures of the N battery modules as the real-time temperature of the battery module set 20.

In some embodiments of the present disclosure, when the real-time temperature of the external environment of the battery pack to which the battery module set 20 belongs is required to be collected as the target sampling temperature, in one case, the temperature sampling module 11 may be disposed at the outside of the body of the battery pack. In another case, the battery pack may be installed in a new energy vehicle, and the temperature sampling module 11 may be disposed on a vehicle chassis of the new energy vehicle.

It should be noted that, in the embodiment of the present disclosure, the real-time temperature of the battery module set 20 or the real-time temperature of the external environment of the battery pack to which the battery module set 20 belongs may be related to the battery capacity. When the real-time temperature of the battery module set 20 or the real-time temperature of the external environment of the battery pack to which the battery module set 20 belongs is low, the battery capacity may be small. Therefore, the collected target sampling temperature may be used as a reference quantity for measuring the battery capacity of the battery.

In some embodiments of the present disclosure, the temperature sampling module 11 and the control module 12 may be connected via a first communication line. The control module 12 may send a control instruction to the temperature sampling module 11 via the first communication line for controlling the temperature sampling module 11 to collect the target sampling temperature. The temperature sampling module 11 may collect the target sampling temperature in response to the control instruction, and return the collected target sampling temperature to the control module 12 via the first communication line.

In some embodiments, a specific implementation of the first communication line may be a daisy-chain communication structure. It should be noted that the control module 12 and the temperature sampling module 11 may also be connected by means of wireless communication.

In some embodiments of the present disclosure, when the temperature sampling module 11 includes multiple temperature sampling units, adjacent temperature sampling units may be connected through a second communication line. The real-time temperatures of the multiple battery modules collected by the multiple temperature sampling units may be transmitted and gathered through the second communication line. The gathered real-time temperatures of the multiple battery modules may be converted by an isolation conversion unit into a data stream in conformity with a protocol of the first communication line, so as to return to the control module 12. In one embodiment, the specific implementation of the second communication line may be a daisy-chain communication structure.

The control module 12 may be configured to control the heating module 13 to enter a first heating mode when the target sampling temperature is not lower than a preset expected heating temperature.

In some embodiments of the present disclosure, the preset expected heating temperature may indicate a temperature at which the battery module set 20 is expected to operate. When the target sampling temperature reaches the preset expected heating temperature, it can be considered that the battery module set 20 is operating at the temperature at which it is expected.

It should be noted that, in the embodiment of the present disclosure, if the battery capacity meets the needs of the user or the manufacturer when the target sampling temperature reaches a certain temperature, then that temperature may be set as the preset expected heating temperature.

It should also be noted that when the temperature sampling module 11 is disposed at a different position, the vehicle is different, or the battery module set 20 is different, the preset expected heating temperature may be preset to different values according to the actual situation.

In some embodiments, the first heating mode may include the heating module 13 using external electric energy to intermittently heat the battery module set 20.

In some embodiments of the present disclosure, the external electric energy may be externally provided. Specifically, the external electric energy may be provided by an external charging device 30.

It should be noted that after the heating module 13 enters the first heating mode, the heating module 13 may finely heat the battery module set 20, such that the target sampling temperature can be accurately maintained at the preset expected heating temperature.

In some embodiments of the present disclosure, there may be a case where the target sampling temperature is lower than the preset expected heating temperature. At this time, in order to improve the working efficiency of the heating module 13, the control module 12 may be further configured to control the heating module 13 to enter a second heating mode when the target sampling temperature is lower than the preset expected heating temperature. Wherein, the second heating mode may include the heating module 13 using external electric energy to continuously heat the battery module set 20.

It should be noted that the heating rate of the target sampling temperature when the heating module 13 enters the second heating mode is greater than the heating rate of the target sampling temperature when the heating module 13 enters the first heating mode. When the target sampling temperature is lower than the preset expected heating temperature, controlling the heating module 13 to enter the second heating mode may enable the target sampling temperature to quickly reach the preset expected heating temperature, and quickly increase the utilization rate of the battery capacity.

In some embodiments of the present disclosure, in order to balance the heating efficiency of the battery heating system 10 and the charging efficiency of the battery module set 20, the battery heating system 10 may further include an external charging device 30 for providing external electric energy.

One terminal of the external charging device 30 may be respectively connected to one terminal of the battery module set 20 and one terminal of the heating module 13, and another terminal of the external charging device 30 may be respectively connected to another terminal of the battery module set 20 and another terminal of the heating module 13.

The external charging device 30 may be configured to enter a first working mode to provide a first portion of the external electric energy to the heating module 13, and to use a second portion of the external electric energy to charge the battery module set 20. And, the external charging device 30 may be configured to enter a second working mode to provide the entire external electric energy to the heating module 13.

Accordingly, the control module 12 may be further configured to control the external charging device 30 to enter the first working mode when the target sampling temperature is not lower than the preset expected heating temperature. And, the control module 12 may be further configured to control the external charging device 30 to enter the second working mode when the target sampling temperature is lower than the preset expected heating temperature.

It should be noted that when the target sampling temperature is not lower than the preset expected heating temperature, the control module 12 may control the external charging device 30 to enter the first working mode, and control the heating module 13 to enter the first heating mode. When the target sampling temperature is lower than the preset expected heating temperature, the control module 12 may control the external charging device 30 to enter the second working mode, and control the heating module 13 to enter the second heating mode.

In some embodiments, one terminal of the external charging device 30 may be referred to as a high-voltage terminal of the external charging device 30, and another terminal of the external charging device 30 may be referred to as a low-voltage terminal of the external charging device 30. In the process of charging the battery module set 20 by the external charging device 30, the high-voltage terminal of the external charging device 30 may be connected to the high-voltage terminal of the battery module set 20, and the low-voltage terminal of the external charging device 30 may be connected to the low-voltage terminal of the battery module set 20.

In some embodiments, the external charging device 30 may represent a charging device capable of outputting DC power. Exemplarily, the external charging device 30 may be an on-board charger (OBC). Specifically, the on-board charger may be connected to a commercial AC grid and output DC power for slowly charging the battery module set 20.

In some embodiments of the present disclosure, the entire external electric energy of the external charging device 30 may represent a maximum electric energy that the external charging device 30 is able to provide for the heating module 13 and/or the battery module set 20. It should be noted that all external electric energy output by the external charging device 30 means ignoring the loss of the output electric energy of the external charging device 30 and other output paths of the output electric energy of the external charging device 30.

In some embodiments, the control module 12 and the external charging device 30 may communicate with each other through a controller area network (CAN) bus. Specifically, the control module 12 may send a control instruction for instructing the external charging device 30 to enter the first working mode, a control instruction for instructing the external charging device 30 to enter the second working mode, or other control instructions to the external charging device 30 through the controller area network bus.

It should be noted that, in the embodiment of the present disclosure, the control module 12 and the external charging device 30 may also be connected by means of wireless communication, and the specific connection between the control module 12 and the external charging device 30 is not limited.

In some embodiments, a vehicle control unit (VCU) may be provided between the control module 12 and the external charging device 30, such that the control module 12 may communicate with the external charging device 30 through the vehicle control unit. For example, the vehicle control unit may forward a control instruction issued by the control module 12 for instructing the external charging device 30 to enter the first working mode, the second working mode, or the third working mode to the external charging device 30.

It should be noted that, the control module 12 and/or the external charging device 30 may also communicate with other functional units in the vehicle through the vehicle control unit.

In some embodiments of the present disclosure, during the entire heating process of the battery module set 20, in order to reduce the consumption of the external electric energy by the battery heating system 10 and account for the charging efficiency, the control module 12 may be further configured to: control the external charging device 30 to enter a third working mode if the target sampling temperature is not lower than a preset initial charging temperature, wherein the third working mode may include using the entire external electric energy to charge the battery module set 20, and the preset initial charging temperature is lower than the preset expected heating temperature; determine whether the target sampling temperature is lower than the preset expected heating temperature after a preset first time period has elapsed since the heating module is controlled to enter the third working mode; control the heating module 13 to enter the first heating mode if the target sampling temperature is not lower than the preset expected heating temperature.

In some embodiments, the initial charging temperature may be expressed as a minimum temperature capable of charging the battery module set 20. For example, the initial charging temperature may be set according to a performance of the battery and/or a correspondence between the capacity of the battery and the target sampling temperature.

It should be noted that the control module 12 may control the external charging device 30 to enter the third working mode. The external charging device 30 may use all external electric energy to charge the battery module set 20, that is, do not output external electric energy to the heating module 13.

In some embodiments of the present disclosure, there may be a case where the target sampling temperature is lower than the preset initial charging temperature. At this time, the control module 12 may be configured to: control the heating module 13 to enter a second heating mode if the target sampling temperature is lower than the preset initial charging temperature, wherein the preset initial charging temperature may be lower than the preset expected heating temperature; determine whether the target sampling temperature is lower than the preset expected heating temperature after a preset first time period has elapsed since the heating module 13 is controlled to enter the second heating mode; control the heating module 13 to enter the first heating mode if the target sampling temperature is not lower than the preset expected heating temperature.

In some embodiments of the present disclosure, after the preset first time period, the target sampling temperature may still be lower than the preset expected heating temperature. At this time, the control module 12 may be further configured to: after performing the step of determining whether the target sampling temperature is lower than the preset expected heating temperature, control the heating module 13 to enter or maintain the second heating mode if the target sampling temperature is lower than the preset expected heating temperature, and determine, every time the preset first time period has elapsed since the heating module is controlled to enter or maintain the second heating mode, whether the target sampling temperature is lower than the preset expected heating temperature, until the target sampling temperature is not lower than the preset expected heating temperature.

In some embodiments of the present disclosure, in order to protect functional modules of the battery heating system 10, the battery module set 20, or the external charging device 30, the heating module 13 should not be in the second heating mode for a long time. At this time, the control module 12 may be further configured to: determine whether a time difference between a current time and a time when the heating module 13 is controlled to enter the second heating mode is greater than a preset second time period; and determine that the heating of the battery heating system 10 is time out if the time difference is greater than the preset second time period.

In some embodiments, the preset second time period may be greater than the preset first time period.

In some embodiments of the present disclosure, in order to reduce energy loss of the battery heating system 10, the heating of the battery module set 20 should be stopped as soon as possible after the charging of the battery module set 20 is ended. At this time, the control module 12 may be further configured to: after the heating module 13 is controlled to enter the first heating mode, determine, every time a preset third time period has elapsed, whether the external charging device 30 has finished charging of the battery module set 20; and control the heating module 13 to stop heating the battery module set 20 if it is determined that the external charging device 30 has finished the charging of the battery module set 20.

In some embodiments, the preset third time period may be set according to a time period during which the external charging device 30 charges the battery module set 20. Specifically, when the entire charging process is slow, the preset third time period may be relatively long, and when the entire charging process is fast, the preset third time period may be relatively short.

In some embodiments of the present disclosure, in order to precisely control the intermittently heating of the heating module 13, the control module 12 may be further configured to: determine a heating duration and a stop heating duration according to the target sampling temperature; control the heating module 13 to enter the first heating mode based on the heating duration and the stop heating duration to intermittently heat the battery module set 20, wherein the heating duration may be a duration during which the control module 12 is to control the heating module 13 to heat the battery module set 20, and the stop heating duration is a duration during which the control module 12 is to control the heating module 13 to stop heating the battery module set 20.

In some embodiments, the heating duration and the stop heating duration may be both related to an actual temperature deviation, wherein the actual temperature deviation may be a difference between the target sampling temperature and the preset expected heating temperature. Exemplarily, as the actual temperature deviation increases, the heating duration may decrease, and the stop heating duration may increase.

It should be noted that, when the control module 12 controls the heating module 13 to enter the second heating mode, the heating duration may be regarded as an entire duration of the heating module 13 in the second heating mode, and the stop heating duration may be zero.

In some embodiments, in order to control the heating module 13 by the control module 12, the battery heating system 10 may further include: a first switch disposed between the one terminal of the external charging device 30 and the one terminal of the heating module 13, and wherein the control module 12 may be configured to control the first switch to be turned on or off, so as to intermittently provide a first portion of the external electric energy to the heating module 13.

It should be noted that, the heating duration may be a turn-on duration of the first switch, and the stop heating duration may be a turn-off duration of the first switch. Therefore, the control module 12 may control the first switch to be intermittently turned on to intermittently provide the first portion of the external electric energy to the heating module 13.

In some embodiments of the present disclosure, the control module 12 may control the first switch to be turned on or off by sending a driving signal to the first switch. Specifically, the driving signal may be divided into a first driving sub-signal that controls the first switch to be intermittently turned on, and a second driving sub-signal that controls the first switch to be continuously turned on.

Wherein, a generation process of the first driving sub-signal may be as follows: the control module 12 may determine, based on the target sampling temperature and a correspondence between the target sampling temperature and the first driving sub-signal, a duration during which the first switch is controlled to be turned on and a duration during which the first switch is controlled to be turned off; and generate, based on the duration during which the first switch is controlled to be turned on and the duration during which the first switch is controlled to be turned off, the first driving sub-signal.

Wherein, the correspondence between the target sampling temperature and the first driving sub-signal may include a correspondence between the target sampling temperature and the duration during which the first switch is controlled to be turned on, and a correspondence between the target sampling temperature and the duration during which the first switch is controlled to be turned off.

In some embodiments, the correspondence between the target sampling temperature and the first driving sub-signal may include: a correspondence between the target sampling temperature and a ratio of the duration during which the first switch is controlled to be turned on to the duration during which the first switch is controlled to be turned off.

In some embodiments, the first driving sub-signal may be represented by a pulse signal with a cycle of T.

It should be noted that, when the first driving sub-signal is a pulse signal, the correspondence between the target sampling temperature and the driving signal may include: a correspondence between the target sampling temperature and the duration during which the first switch is controlled to be turned on of each cycle, and a correspondence between the target sampling temperature and the duration during which the first switch is controlled to be turned off of each cycle.

In one embodiment, the first driving sub-signal may include: a high level which may control the first switch to be turned on, and a low level which may control the first switch to be turned off.

Accordingly, the correspondence between the target sampling temperature and the first driving sub-signal may be expressed as a relationship between the target sampling temperature and a duty ratio of the first driving sub-signal. The duty ratio of the first driving sub-signal may indicate a ratio of the duration during which the first switch is controlled to be turned on of a cycle to the total duration of the cycle.

It should also be noted that, for different situations such as different battery module sets 20 and different preset expected heating temperatures, the correspondence between the target sampling temperature and the first driving sub-signal is different. Therefore, the correspondence between the target sampling temperature and the driving signal often requires a vehicle calibration.

In some embodiments of the present disclosure, the control module 12 may be configured to: determine a difference between the target sampling temperature and the preset expected heating temperature as an actual temperature deviation; determine the heating duration and the stop heating duration according to the actual temperature deviation and a proportion-integral-derivative (PID) algorithm.

In some embodiments, when the control module 12 controls the heating module 13 through the first switch, and the first sub-driving signal is a pulse signal, the control module 12 may be configured to: determine the duration during which the first switch is controlled to be turned on and the duration during which the first switch is controlled to be turned off based on the actual temperature deviation and the proportion-integral-derivative algorithm.

By using the proportional-integral-derivative algorithm, the duty cycle of the first driver signal can be calculated. When the first driving signal maintains the duty cycle, the target sampling temperature can be maintained at the preset expected heating temperature.

In some embodiments of the present disclosure, the control module 12 may be implemented as a controller and a driving unit.

Wherein, the controller may be configured to send a driving instruction for controlling the driving unit to generate the driving signal, and send various instructions to other functional modules of the battery heating system 10.

The driving unit may be configured to receive the driving instruction sent by the controller of the control module 12 for controlling the driving unit to generate the driving signal, and generate, in response to the driving instruction, the first driving sub-signal and the second driving sub-signal.

It should be noted that an isolation unit may be provided between the driving unit and the controller of the control module 12 to electrically isolate communication therebetween.

In some embodiments of the present disclosure, the first switch may be a switch that can be turned on or off under the control of the control module 12. Wherein, the first switch may include a relay, a metal oxide semiconductor (Metal Oxide Semiconductor, MOS) field-effect transistor, or other switches.

In some optional embodiments, in order to achieve fast and accurate control of the heating module 13 through fast switching of the first switch, the first switch may include a MOS field-effect transistor.

It should be noted that when control of the heating module 13 is achieved by the relay, mechanical properties of the relay may not allow the relay to quickly switch on and off, and it is required to dispose a corresponding control circuit for the relay. Therefore, compared with the relay, in this embodiment, the control module 12 may control the heating module 13 by controlling the MOS field-effect transistor. As a result, fast and accurate control of the heating module 13 can be realized, while the entire battery heating system 10 is relatively simple and energy consumption of the entire battery heating system 10 is reduced.

In some embodiments of the present disclosure, the first switch is preferably a switch with over-temperature protection. Exemplarily, the first switch may be a MOS field-effect transistor with over-temperature protection.

In some embodiments, if the first switch is a MOS field-effect transistor with over-temperature protection, the battery heating system 10 may further include a signal feedback check module.

Specifically, the driving signal of the first switch may be returned to the control module 12 as a feedback signal, the driving signal generated by the control module 12 may be used as a reference driving signal, and it may be determined whether the feedback signal is the same as the reference driving signal. If they are the same, it may be determined that the feedback signal is a normal feedback signal, and the first switch is normal. If the feedback signal does not completely track the reference driving signal, it is considered that there is an over-temperature fault at the first switch.

Figure 2:
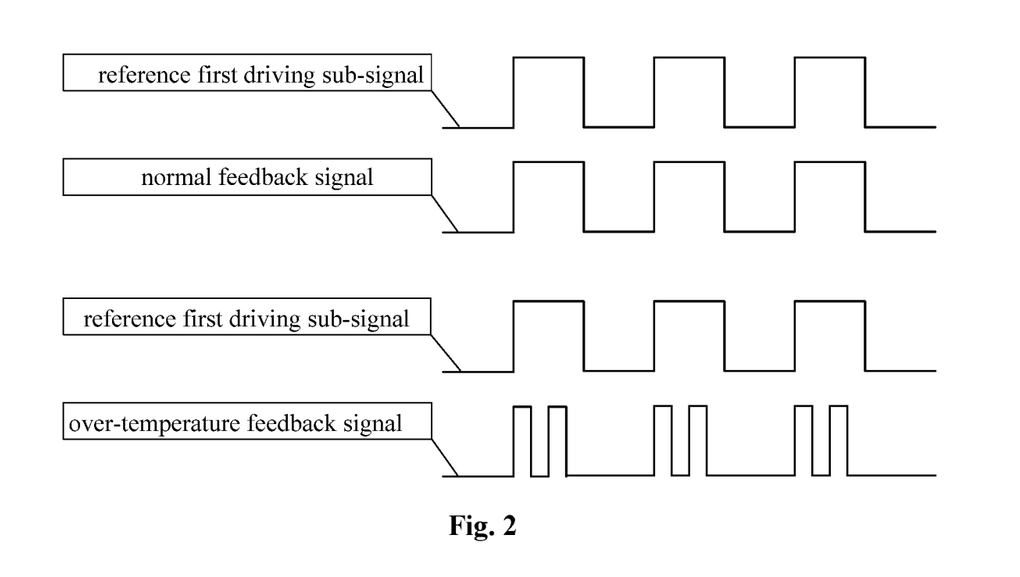
FIG. 2 is a schematic diagram of a reference first driving sub-signal and a feedback signal of an example according to an embodiment of the present disclosure.

As an example, taking the first driving sub-signal as an example, FIG. 2 is a schematic diagram of a reference first driving sub-signal and a feedback signal of an example according to an embodiment of the present disclosure.

As shown in FIG. 2, in a case where the reference first driving sub-signal is a pulse signal, if the duty ratio of the feedback signal is the same as that of the reference first driving sub-signal, the feedback signal is determined to be a normal feedback signal; and if compared to the reference first driving sub-signal, the feedback signal is frequently pulled to a low level when the reference first driving sub-signal is at a high level, the feedback signal is determined to be an over-temperature feedback signal.

In some embodiments, in order to protect the first switch from over-temperature, when the feedback signal is an over-temperature feedback signal, the first switch may achieve a short-ground characteristic of the input impedance. Specifically, when the short-ground characteristic of the input impedance of the first switch is activated, a short circuit is formed between the gate and the drain of the first switch, the voltage of the gate is smaller than a threshold voltage, and the first switch is turned off.

The heating module 13 may be configured to enter the first heating mode, and use the first portion of the external electric energy to intermittently heat the battery module set 20.

According to the battery heating system 10 in the embodiment of the present disclosure, compared to a case where the collected target sampling temperature is not lower than the preset expected heating temperature, when the collected target sampling temperature is lower than the preset expected heating temperature, the capacity utilization rate of the battery capacity may be lower. Therefore, when the target sampling temperature is not lower than the expected heating temperature, a portion of the output electric energy of the external charging device may be used to intermittently heat the battery module set 20 to maintain the target sampling temperature at the preset expected heating temperature. When the target sampling temperature is maintained at a preset expected heating temperature, the capacity utilization rate of the battery capacity may be high. Therefore, the embodiments of the present disclosure may improve the utilization rate of the battery capacity.

In some embodiments of the present disclosure, in order to improve the uniformity of heating and the heating performance of the heating module 13, the heating module 13 may include N heaters connected in series. The N heaters included in the heating module 13 may be in one-to-one correspondence with the N battery modules included in the battery module set 20.

For example, if the battery module set 20 includes N battery modules connected in series, N heaters connected in series may be provided on one side of the battery module set 20, and each heater heats the corresponding battery module. Preferably, in order to further improve the uniformity of heating and the heating performance of the heating module 13, each of the heaters and the corresponding battery module may be uniformly spaced.

It should be noted that, in order to further improve the uniformity of heating and the heating performance of the heating module 13, each heater may include multiple heating units. Specifically, each heater may include m heating units, and the m heating units may be evenly distributed around each battery module set 20, where m is a positive integer. For example, if each heater includes two heating units, N heating units may be disposed on one side of the battery module set 20 in one-to-one correspondence with the N battery modules included in the battery module set 20. The remaining N heating units may be disposed on the other side of the battery module set 20 in one-to-one correspondence with the N battery modules included in the battery module set 20.

In some embodiments, the heater may be a heating device having an electrothermal effect. Exemplarily, the heater may be a heating film or a heating resistor.

In some embodiments of the present disclosure, in order to further improve safety of the battery heating system 10, the battery heating system 10 may further include a second switch in addition to the first heating device.

Wherein, for the safety of the battery heating system 10, the second switch may be disposed between the another terminal of the heating module 13 and the another terminal of the external charging device 30.

In some embodiments, when the battery heating system 10 includes the first switch and the second switch, the control module 12 may indirectly control the heating module 13 to heat the battery module set 20 or stop heating the battery module set 20 by controlling the first switch and the second switch to be turned on at the same time or turned off at the same time.

In a scenario where the heating module 13 is required to be controlled to stop heating the battery module set 20, the first switch and the second switch may be set in such a way that when one of the first switch and the second switch fails to be off due to a failure such as adhesion, the heating of the battery module set 20 by the heating module 13 can be stopped timely by controlling another one of the first switch and the second switch fails to be off.

In some optional embodiments, characteristics of the second switch are the same as those of the first switch in the foregoing embodiments, and details are not described herein again.

It should be noted that the second switch may be a relay, a MOS field-effect transistor, or other switch capable of being turned on or off under the control of the control module 12.

In some embodiments of the present disclosure, in order to achieve fast and accurate control of the heating module 13, at least one of the first switch and the second switch may be a MOS field-effect transistor.

For example, the first switch is a MOS field-effect transistor, the second switch is a relay. When the battery module set 20 needs to be heated by the battery heating system 10, the second switch may be controlled to be always in an off state, and the driving signal may be output to the first switch 13.

In some embodiments of the present disclosure, in addition to the first switch and the second switch in the above embodiments, the battery heating system 10 may further include a voltage sampling module respectively connected to the two terminals of the heating module 13 and configured to collect first collected voltage data of the one terminal of the heating module and second collected voltage data of the another terminal of the heating module, wherein the one terminal of the heating module 13 is connected to a low-voltage terminal of the external charging device 30 via the first switch, and the another terminal of the heating module 13 is connected to a high-voltage terminal of the external charging device 30 via the second switch.

Wherein, the control module 12 is further configured to determine whether the battery heating system 10 is operating normally according to the first collected voltage data and the second collected voltage data collected by the voltage sampling module as well as a preset normal operation judgment condition; and determine that the battery heating system 10 is operating normally if both the first collected voltage data and the second collected voltage data satisfy the normal operation judgment condition.

It should be noted that in the embodiments of the present disclosure, the first collected voltage data may indicate a potential difference between a potential at the one terminal of the heating module 13 and a reference potential. The second collected voltage data may indicate a potential difference between a potential at the another terminal of the heating module 13 and the reference potential. The reference potential may be a potential of a low-voltage side of the external charging device 30.

In some embodiments, the voltage sampling module may be connected to the control module 12.

Specifically, the control module 12 may be configured to send a collecting instruction the voltage sampling module for instructing the voltage sampling module to collect the first collected voltage data and the second collected voltage data. The voltage sampling module may be configured to collect the first collected voltage data and the second collected voltage data in response to the collecting instruction, and return the collected first collected voltage data and second collected voltage data to the control module 12.

The connection between the voltage sampling module and the control module 12 may be a wired connection or a wireless connection.

In an embodiment, an isolation unit may be provided between the voltage sampling module and the control module 12.

It should be noted that in the embodiments of the present disclosure, normal operation of the battery heating system 10 may indicate that there is no heating failure of the battery heating system 10.

For example, if the battery heating system 10 includes the first switch and the second switch, the normal operation of the battery heating system 10 may include that the first switch and the second switch can be normally turned on and off according to the driving signal.

In some embodiments, the normal operation judgment condition may include: before the battery module set 20 is heated by the heating module 13: when both the first switch and the second switch are turned off, both the first collected voltage data and the second collected voltage data are smaller than a preset first calibration value; when the first switch is turned off and the second switch is turned on, both the first collected voltage data and the second collected voltage data are greater than a preset second calibration value; and when both the first switch and the second switch are turned on, the first collected voltage data is smaller than the preset first calibration value and the second collected voltage data is greater than the preset second calibration value.

The first calibration value is a product of a first calibration voltage and a first calibration coefficient. The first calibration voltage is a voltage at a connection of the second switch and the high-voltage terminal of the external charging device 30 when both the first switch and the second switch are turned off.

The second calibration value is a product of a second calibration voltage and a second calibration coefficient. The second calibration voltage is a voltage at a connection of the heating module 13 and the first switch when both the first switch and the second switch are turned on.

It should be noted that, the first calibration voltage in the embodiments of the present disclosure may indicate a potential difference between a potential at a terminal of the second switch connected to the high-voltage terminal of the external charging device 30 and the reference potential. The second calibration voltage may indicate a potential difference between the potential at the one terminal of the heating module 13 and the reference potential.

It should also be noted that, in other embodiments of the present disclosure, the one terminal of the heating module 13 may also be connected to the high-voltage terminal of the external charging device 30, and the another terminal of the heating module 13 may be connected to the low-voltage terminal of the external charging device 30.

In an embodiment, the second collected voltage data may be collected at the one terminal of the heating module 13, and the first collected voltage data may be collected at the another terminal of the heating module 13. In this embodiment, the first calibration voltage may indicate a potential difference between the potential at a terminal of the first switch connected to the high-voltage terminal of the external charging device 30 and the reference potential, and the second calibration voltage may indicate a potential difference between the potential at the another terminal of the heating module 13 and the reference potential.

In an embodiment, the control module 12 may generate a driving signal, and use the driving signal to control the first switch to be turned on or off and the second switch to be in the off state, so that the heating module 13 may heat the battery module set 20. Alternatively, in response to the instruction from the control module 12 for starting operation of the battery heating system 10, the first switch may be turned on or off and the second switch may be in the off state according to the driving signal, so that the heating module 13 may heat the battery module set 20.

For example, the first switch is a low-voltage-side switch and the second switch is a high-voltage-side switch; the first collected voltage data is represented as V_P_1, and the second collected voltage data is represented as V_P_2; the first calibration value is represented as Va, the first calibration voltage is represented as $Va_0$, and the first calibration coefficient is represented as $\alpha_a$; and the second calibration value is represented as Vb, the second calibration voltage is represented as $Vb_0$, and the second calibration coefficient is represented as $\alpha_b$.

The normal operation judgment condition may include before the battery module set 20 is heated by the heating module 13: when both the first switch and the second switch are turned off, V_P_1<Va and V_P_2<Va; when the first switch is turned off and the second switch is turned on, V_P_1>Vb, and V_P_2>Vb; and when both the first switch and the second switch are turned on, V_P_1<Va, and V_P_2>Vb.

Va satisfies formula (1):

$$Va = Va_0 \times \alpha_a \quad (1)$$

Vb satisfies formula (2):

$$Vb = Vb_0 \times \alpha_b \quad (2)$$

In some embodiments, as the first calibration voltage may generate voltage fluctuations, the first calibration coefficient may be smaller than 1. For example, the first calibration coefficient may be 90%.

In some embodiments, if the first switch and the low-voltage terminal of the external charging device 30 are both grounded, in view of the effect of ground offset, the second calibration coefficient may be greater than 1. For example, the second calibration coefficient may be 150%.

In some other embodiments, the normal operation judgment condition may include before the heating module 13 finishes heating of the battery module set 20: when the first switch is turned off and the second switch is turned on, both the first collected voltage data and the second collected voltage data are greater than the preset second calibration value; and when both the first switch and the second switch are turned off, both the first collected voltage data and the second collected voltage data are smaller than the preset first calibration value.

In an embodiment, the first switch is continuously in the off state after the driving signal ends; or, the first switch and the second switch are continuously in the off state in response to an instruction to stop heating from the control module 12, so that the heating module 13 may finish heating the battery module set 20.

For example, when the first switch is turned off and the second switch is turned on, V_P_1>Vb, and V_P_2>Vb; and when both the first switch and the second switch are turned off, V_P_1<Va, and V_P_2<Va.

In some embodiments of the present disclosure, in order to ensure the communication quality between the control module 12 and the first switch, an isolation unit may be provided between the control module 12 and the first switch to electrically isolate the communication between the control module 12 and the first switch.

It should be noted that, when other functional modules except the first switch in the battery heating system 10 communicate with the control module 12, isolation unit(s) may be provided between the other functional modules and the control module 12.

Figure 3:
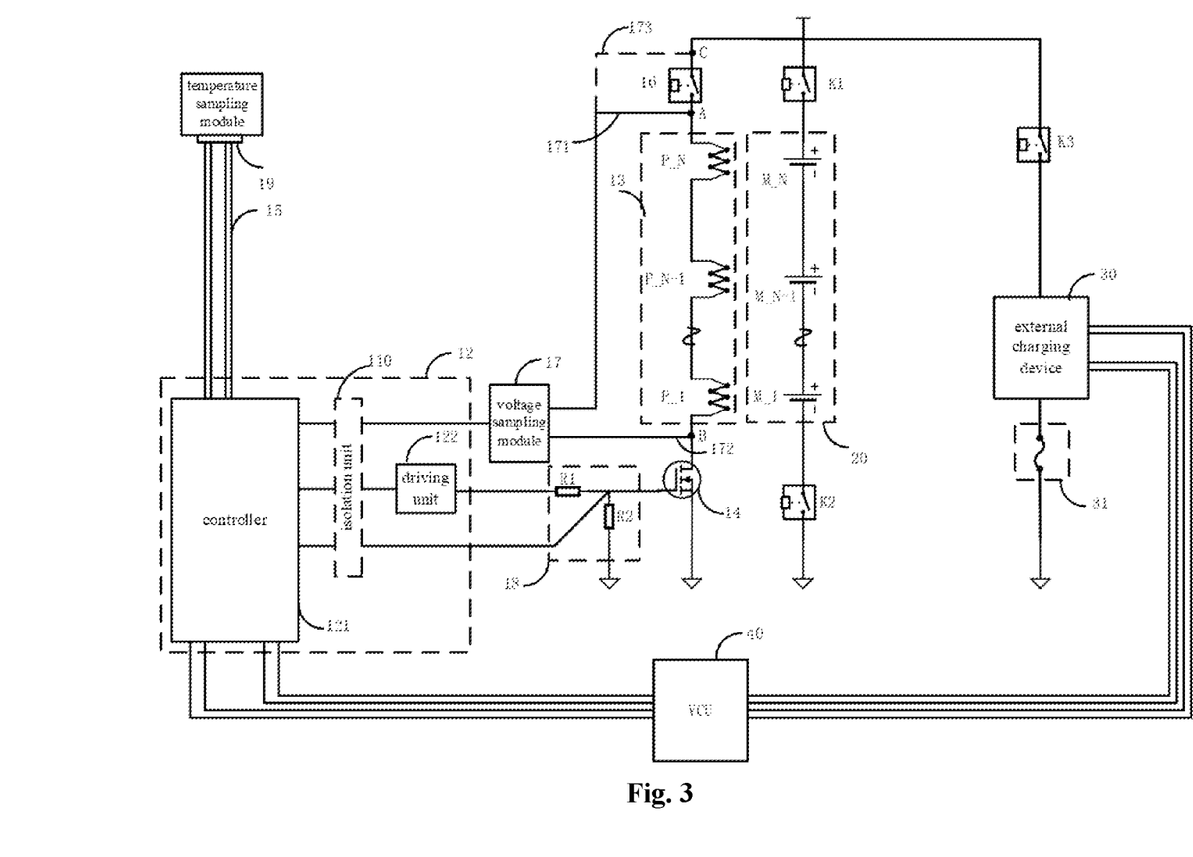
FIG. 3 is a schematic structural diagram of a battery heating circuit according to an embodiment of the present disclosure.

In some embodiments of the present disclosure, when the target sampling temperature is the real-time temperature of the battery module set 20, an implementation of the battery heating system 10 may be a battery heating circuit. FIG. 3 is a schematic structural diagram of a battery heating circuit according to an embodiment of the present disclosure.

As shown in FIG. 3, the battery heating circuit 300 may include: a temperature sampling module 11, a control module 12, a heating module 13, a first switch 14, a first communication line 15, a second switch 16, a voltage sampling module 17, and a signal check-back module 18 and an isolation conversion unit 19.

The battery module set 20 may be consisted of N battery modules connected in series. The N battery modules may be identified as M_1, . . . , M_N−1, M_N, respectively. The one terminal of the external charging device 30 connected to the second switch 16 may be a high-voltage terminal of the external charging device 30, and the another terminal of the external charging device 30 that is grounded may be a low-voltage terminal of the external charging device 30.

After the target sampling temperature is collected by the temperature sampling module 11, the collected target sampling temperature may be converted into a data stream in conformity with a first communication line protocol through the isolation communication unit 19, and then transmitted to the controller 121 through the first communication line 15.

The control module 12 may be respectively connected to the temperature sampling module 11, the voltage sampling module 17, the gate of the first switch 14, the signal check-back module 18, and the second switch 16. The connection between the control module 12 and the second switch module 16 is not shown in FIG. 3.

The heating module 13 may include N heaters connected in series, which may be identified as P_1, . . . , P_N−1, and P_N, respectively. The N heaters may heat the N battery modules, respectively.

One terminal of the first switch 14 may be connected to one terminal of the first heater P_1, and another terminal of the first switch 14 may be grounded.

One terminal of the second switch 16 may be connected to one terminal of the N-th heater P_N, and another terminal of the second switch 16 may be respectively connected to the high-voltage terminal of the battery module set 20 and the high-voltage terminal of the external charging device 30.

The voltage sampling module 17 may collect the second collected voltage data V_P_2 at point A through a first solid line 171. The voltage sampling module 17 may collect the first collected voltage data V_P_1 at point C through a second solid line 172.

In some embodiments, the signal check-back module 18 may include a first resistor R1 and a second resistor R2. One end of the first resistor R1 is connected to the control module 12, and the other end of the first resistor R1 is connected to the first switch 14. One end of the second resistor R2 is connected to the other end of the first resistor R1, and the other end of the second resistor R2 is grounded.

Specifically, when the first switch 14 operates normally, a voltage dividing circuit consisted of R1 and R2 may provide a gate driving voltage for the first switch 14. When the first switch 14 is over-temperature or there is an over-temperature due to a short-circuit current with the drain directly connected to the power supply, the first switch 14 may internally short circuit the gate-to-source impedance Rgs of the first switch 14, so that the equivalent parallel resistance value from parallelization of Rgs and R2 becomes much smaller than R2. As a result, the gate driving voltage at the gate of the first switch 14 obtained by voltage dividing is far smaller than a threshold voltage that may enable the first switch 14 to be turned on. In this way, the first switch 14 is turned off, and an over-temperature protection is achieved at the first switch 14.

In an optional embodiment, in order to enable the first switch 14 to have a good over-temperature protection performance, the first resistor R1, the second resistor R2, and a short-circuit input impedance RS of the first switch 14 may simultaneously satisfy formula (3) and formula (4):

$$R2 > 10 \times R1 \tag{3}$$

$$R1 \gg 10 \times RS \tag{4}$$

RS may represent the gate input impedance when the gate is shorted to the source.

It should be noted that R1 and R2 need to be within a reasonable range, so that the magnitude of the driving current of the first switch 14 may meet a corresponding requirement.

In some embodiments, the control module 12 may include a controller 121 and a driving unit 122. In these embodiments, the battery heating circuit 300 may further include an isolation unit 110.

In order to electrically isolate the communication between the controller 121 and other function modules or function units, the isolation unit 110 may be provided on a line between the controller 121 and the driving unit 122, a line between the controller 121 and the voltage sampling module 17, and a line between the controller 121 and the signal check-back module 18.

In some embodiments, both the first calibration voltage and the second calibration voltage may be collected by the voltage sampling module 17. In these embodiments, a dashed line 173 in FIG. 3 may indicate that the voltage sampling module 17 collects a voltage at point C, and the collected voltage may be used as the first calibration voltage $Va_0$. A solid line 172 may indicate that the voltage sampling module 17 collects a voltage at point B, and the collected voltage may be used as the second calibration voltage $Vb_0$.

In some embodiments, in order to quickly disconnect the connection between the battery module set 20 and the battery heating circuit 300, a switch may be provided at either end of the battery module set 20, or at both ends of the battery module set 20. For example, as shown in FIG. 3, a switch K1 and a switch K2 are respectively provided at both ends of the battery module set 20.

In some embodiments, in order to ensure heating safety and/or charging safety of the entire heating system, the high-voltage terminal of the external charging device 30 may be further provided with a switch K3.

It is noted that the control module 12 may control the switch K3 to be turned off when the first switch 14 and the second switch 16 fail to be off due to a failure, so as to ensure the safe heating of the battery heating system 10.

In some embodiments, a specific implementation of the control module 12 controlling the external charging device 30 to enter the first working mode may be: controlling the switch K1, the switch K2, the switch K3, and the second switch 16 to be turned on, and controlling the first switch 14 to be intermittently turned on.

A specific implementation of the control module 12 controlling the external charging device 30 to enter the second working mode may include: controlling the switch K3 and the second switch 16 to be turned on, controlling the first switch 14 to be continuously turned on, and controlling the switch K1 and the switch K2 to be turned off.

A specific implementation of the control module 12 controlling the external charging device 30 to enter the third working mode may include: controlling the switch K1, the switch K2, the switch K3 to be turned on, and controlling the first switch 14 and the second switch 16 to be turned off.

The switching states of the first switch 14, the second switch 16, the switch K1, the switch K2, and the switch K3 may be controlled by the control module 12.

In some embodiments, in order to ensure heating safety and/or charging safety of the entire heating system, a safety device 31 may be provided at one terminal of the external charging device 30. By way of example, the safety device 31 may be a fuse.

In some embodiments, in order to ensure communication between the control module 12 and the external charging device 30, a vehicle control unit 40 may be provided between the external charging device 30 and the controller 121.

In some embodiments, after the heating module 13 is controlled to stop heating the battery module set 20, the control module 12 may first control the switch K3 to be turned off, then control the first switch 14 and the second switch 16 to be turned off, and finally control the switches K1 and K2 to be turned off.

Figure 4:
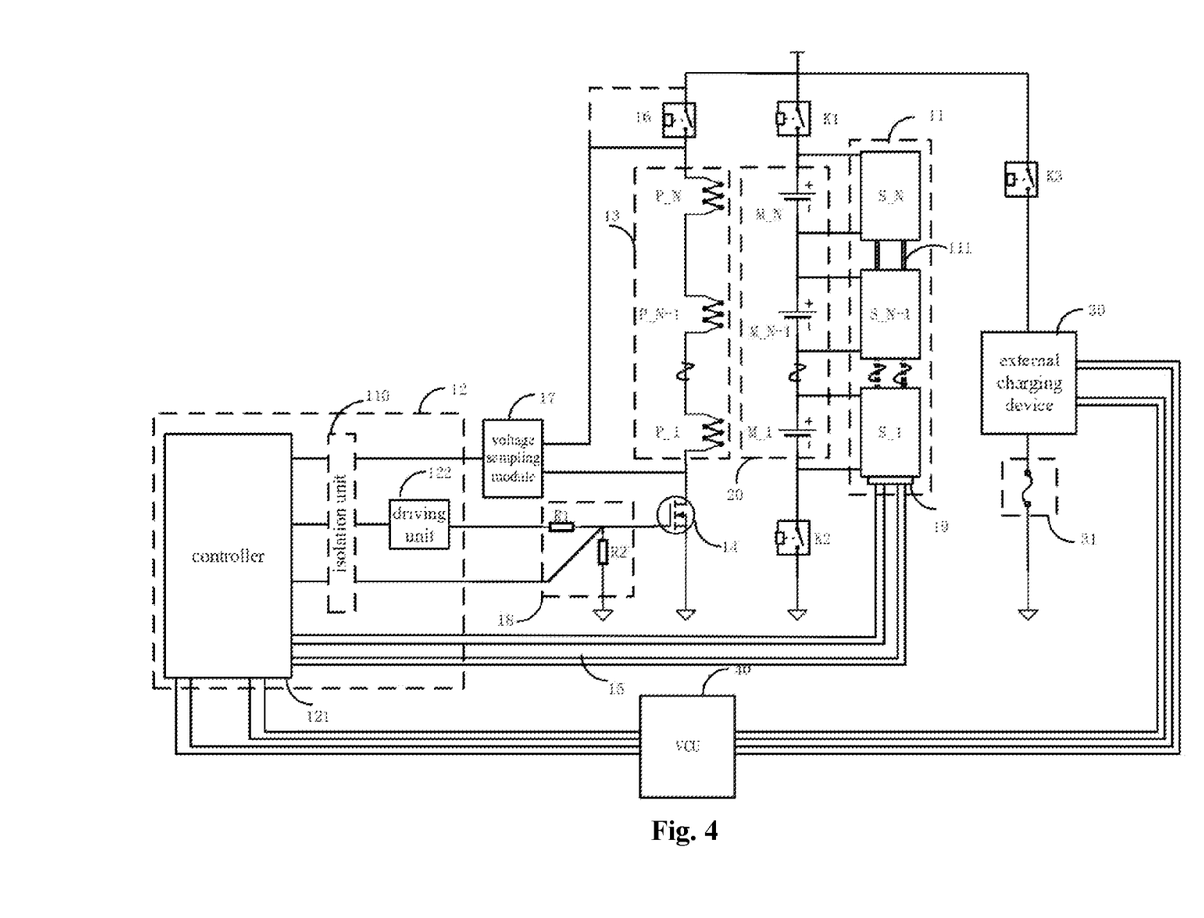
FIG. 4 is a schematic structural diagram of another battery heating circuit according to an embodiment of the present disclosure.

In other embodiments of the present disclosure, when the target sampling temperature is the real-time temperature of the external environment of the battery pack to which the battery module set 20 belongs, an implementation of the battery heating system 10 may use another battery heating circuit. FIG. 4 is a schematic structural diagram of another battery heating circuit according to an embodiment of the present disclosure.

FIG. 4 differs from FIG. 3 in that the temperature sampling module 11 may include N temperature sampling units, which are identified as S_1, S_N−1, and S_N, respectively. Adjacent temperature sampling units may be connected via a second communication line 111.

The N temperature sampling units are respectively disposed at both ends of the N battery modules. For example, the temperature sampling unit S_1 is disposed at both ends of the battery module M_1, . . . , the temperature sampling unit S_N−1 is disposed at both ends of the battery module M_N−1, and the temperature sampling unit S_N is disposed at both ends of the battery module M_N.

After each temperature sampling unit collects the real-time temperature of the corresponding battery module, the real-time temperatures of multiple battery modules may be transferred among the temperature sampling units through the second communication line 111. After the real-time temperatures of the N battery modules are gathered, they are converted into a data stream in conformity with the first communication line protocol through the isolation communication unit 19, and then transmitted to the controller through the first communication line 15.

It should be noted that this embodiment illustrates only one transmission fashion of the real-time temperature(s) of the battery module(s), data about the real-time temperature(s) of the battery module(s) may be sent to the controller 121 respectively or gathered and then sent to the controller 121, by wireless or wired means.

Figure 5:
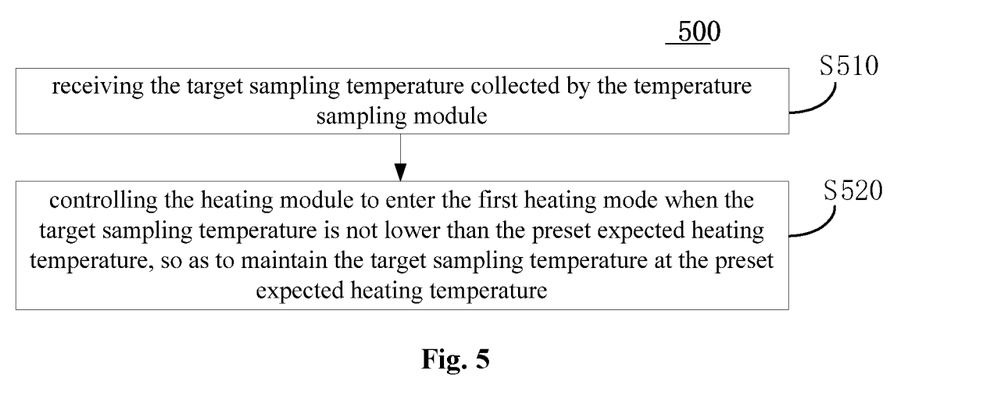
FIG. 5 is a schematic flowchart of a battery heating method according to an embodiment of the present disclosure.

Based on the same concept, a battery heating method is also provided in the embodiments of the present disclosure. FIG. 5 illustrates a flowchart of a battery heating method according to an embodiment of the present disclosure, which may be applicable to the above battery heating system 10. The battery heating method may be executed by the control module 12.

As shown in FIG. 5, a battery heating method 500 may include: S510, receiving the target sampling temperature collected by the temperature sampling module 11; and S520, controlling the heating module 13 to enter the first heating mode when the target sampling temperature is not lower than the preset expected heating temperature, so as to maintain the target sampling temperature at the preset expected heating temperature.

Wherein, the first heating mode comprises intermittently heating the battery module set 20 by using a first portion of the external electric energy.

In some embodiments of the present disclosure, after S510, the method may further include: controlling an external charging device 30 to enter a first working mode when the target sampling temperature is not lower than the preset expected heating temperature, wherein the first working mode comprises providing a first portion of the external electrical energy to the heating module 13 and using a second portion of the external electric energy to charge the battery module set 20; and controlling the external charging device 30 to enter a second working mode when the target sampling temperature is lower than the preset expected heating temperature, wherein the second working mode comprises providing the entire external electric energy to the heating module 13.

In some embodiments of the present disclosure, S520 may include: controlling the heating module 13 to enter a second heating mode if the target sampling temperature is lower than a preset initial charging temperature, wherein the preset initial charging temperature is lower than the preset expected heating temperature, and the second heating mode comprises using the entire external electric energy of the external charging device 30 to continuously heat the battery module set 20; determining whether the target sampling temperature is lower than the preset expected heating temperature after a preset first time period has elapsed since the heating module 13 is controlled to enter the second heating mode; and controlling the heating module 13 to enter the first heating mode if the target sampling temperature is not lower than the preset expected heating temperature.

In some embodiments of the present disclosure, after S510, the battery heating method 500 may further include: controlling the external charging device 30 to enter a third working mode if the target sampling temperature is not lower than the initial charging temperature, wherein the third working mode comprises using the entire external electric energy of the external charging device 30 to charge the battery module set 20; determining whether the target sampling temperature is lower than the preset expected heating temperature after the preset first time period has elapsed since the external charging device 30 is controlled to enter the third working mode; and controlling the heating module 13 to enter the first heating mode if the target sampling temperature is not lower than the preset expected heating temperature.

In some embodiments of the present disclosure, after determining whether the target sampling temperature is lower than the preset expected heating temperature, the battery heating method 500 may further include: controlling the heating module 13 to maintain the second heating mode if the target sampling temperature is lower than the preset expected heating temperature; and determining, every time the preset first time period has elapsed since the heating module 13 is controlled to maintain the second heating mode, whether the target sampling temperature is lower than the preset expected heating temperature, until the target sampling temperature is not lower than the preset expected heating temperature.

In some embodiments of the present disclosure, the battery heating method 500 may further include: determining whether a time difference between a current time and a time when the heating module 13 is controlled to enter the second heating mode is greater than a preset second time period; and determining that the heating of the battery heating system 10 is time out if the time difference is greater than the preset second time period.

In some embodiments of the present disclosure, the controlling the heating module 13 to enter the first heating mode in S520 may include: controlling a first switch to be turned on or off, so as to intermittently provide the first portion of the external electric energy to the heating module 13.

In some embodiments, the first switch may include a metal oxide semiconductor field effect transistor.

In some embodiments of the present disclosure, the battery heating method 500 may further include: after the heating module 13 is controlled to enter the first heating mode, determining, every time a preset third time period, whether the external charging device 30 has finished charging of the battery module set 20; and controlling the heating module 13 to stop heating the battery module set 20 if it is determined that the external charging device 30 has finished the charging of the battery module set 20.

In some embodiments of the present disclosure, the controlling the heating module 13 to enter the first heating mode in S520 may include: determining a heating duration and a stop heating duration according to the target sampling temperature; controlling the heating module 13 to enter the first heating mode based on the heating duration and the stop heating duration, so as to enable the heating module 13 to intermittently heat the battery module set 20, wherein the heating duration is a duration during which an external charging device 30 is to control the heating module 13 to heat the battery module set 20, and the stop heating duration is a duration during which the external charging device 30 is to control the heating module 13 to stop heating the battery module set 20.

In some embodiments, the determining the heating duration and the stop heating duration may include: determining a difference between the target sampling temperature and the preset expected heating temperature as an actual temperature deviation; and determining the heating duration and the stop heating duration according to the actual temperature deviation and a proportion-integral-derivative algorithm.

In some embodiments of the present disclosure, a second switch may be disposed between the another terminal of the heating module 13 and the another terminal of the battery module set 20, and the battery heating method 500 may further include: receiving first collected voltage data of the one terminal of the heating module 13 and second collected voltage data of the another terminal of the heating module 13 collected by a voltage sampling module; determining whether the battery heating system 10 is operating normally according to the first collected voltage data, the second collected voltage data, and a preset normal operation judgment condition; and determining that the battery heating system 10 is operating normally if both the first collected voltage data and the second collected voltage data satisfy the normal operation judgment condition.

Figure 6:
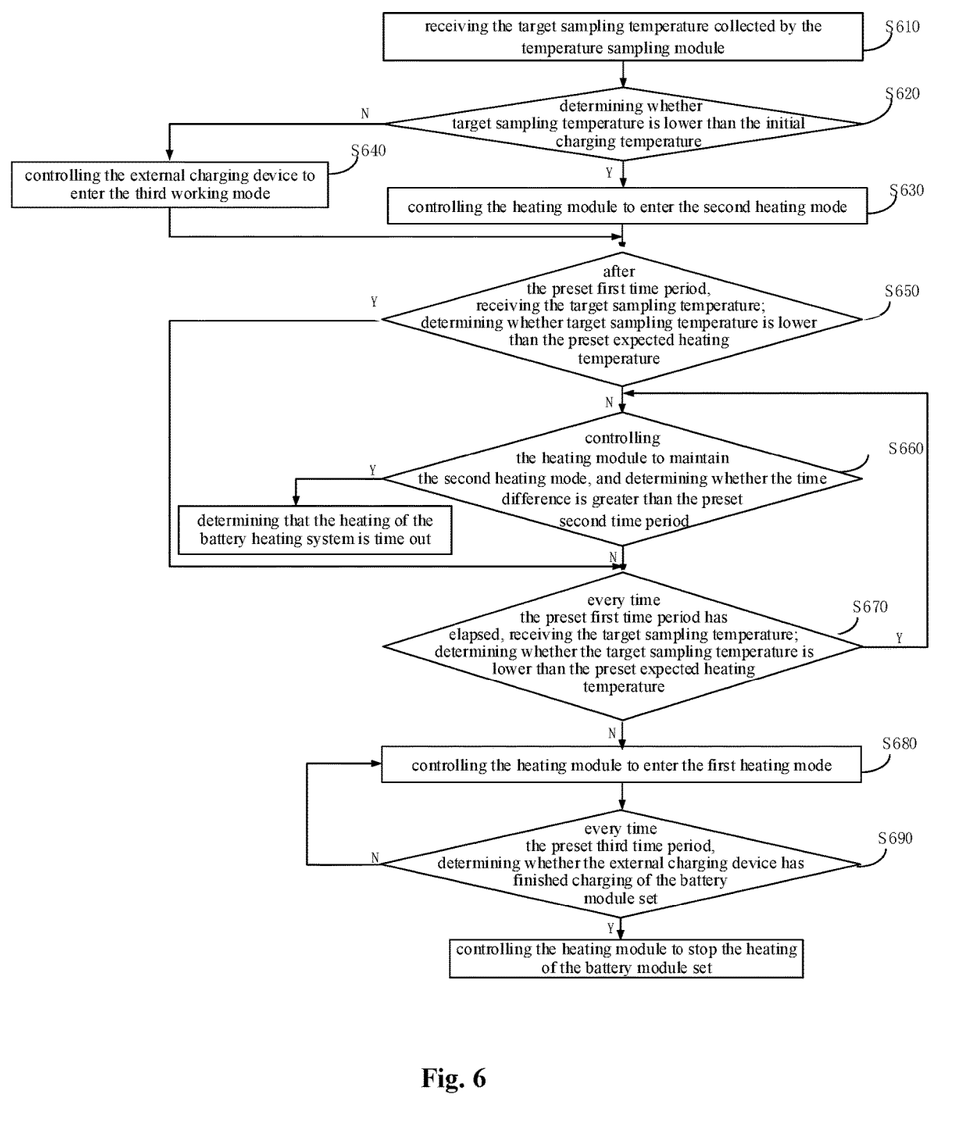
FIG. 6 is a schematic flowchart of another battery heating method according to an embodiment of the present disclosure.

FIG. 6 is a schematic flowchart of another battery heating method according to an embodiment of the present disclosure. As shown in FIG. 6, the battery heating method 600 may include S610 to S690.

In S610, the target sampling temperature collected by the temperature sampling module 11 may be received.

In S620, whether the target sampling temperature collected in S610 is lower than the initial charging temperature may be determined. If yes, the process is proceeded to S630; if no, the process is proceeded to S640.

In S630, the heating module 13 may be controlled to enter the second heating mode, and the process is proceeded to S650.

In S640, the external charging device 30 may be controlled to enter the third working mode, and the process is proceeded to S650.

In S650, after the heating module 13 is controlled to enter the second heating mode or the external charging device 30 is controlled to enter the third working mode, after the preset first time period, the target sampling temperature collected by the temperature sampling module 11 may be received, and whether the target sampling temperature collected in this step is lower than the preset expected heating temperature may be determined. If not, the process is proceeded to S660; and if yes, the process is proceeded to S670.

In S660, the heating module 13 may be controlled to maintain the second heating mode, and whether the time difference between the current time and the time when the heating module is controlled to enter the second heating mode is greater than the preset second time period may be determined. If yes, it is determined that the heating of the battery heating system 10 is time out; If not, the process is proceeded to S670.

In S670, every time the preset first time period has elapsed since S660 is executed, the target sampling temperature collected by the temperature sampling module 11 may be received, and whether the target sampling temperature collected in this step is lower than the preset expected heating temperature may be determined. If yes, S660 and S670 may be repeated, if not, the process is proceeded to S680.

In S680, the heating module 13 may be controlled to enter the first heating mode.

In S690, every time the preset third time period since S680 is executed, whether the external charging device 30 has finished charging of the battery module set 20 may be determined. If yes, the heating module 13 may be controlled to stop the heating of the battery module set 20; if not, return to S680.

It is to be understood that the various embodiments in the disclosure are described in a progressive manner, and the same or similar parts between the various embodiments may be referred to each other, and each embodiment focuses on differences from other embodiments. For the apparatus embodiment, relevant aspects can be found in the description section of the method embodiment. The embodiments of the disclosure are not limited to the specific steps and structures described above and illustrated in the drawings. A person skilled in the art can make various changes, modifications and additions, or change the order between the steps under the spirit of the embodiments of the disclosure. Also, a detailed description of known method techniques is omitted herein for the sake of brevity.

The functional blocks (e.g., the temperature sampling module, the temperature sampling unit, the control module, the controller, the driving unit, the heating module, the external charging device, the first switch, the second switch, the isolation unit, the isolation conversion unit, the signal check-back module and the like) described above may be implemented as hardware, software, firmware, or a combination thereof. When implemented in hardware, it can be, for example, an electronic circuit, an application specific integrated circuit (ASIC), suitable firmware, plug-ins, function cards, and the like. When implemented in software, the elements of the embodiments of the disclosure may be programs or code segments that can be used to perform required tasks. The program or code segments may be stored in a machine readable medium or transmitted over a transmission medium or communication link through a data signal carried in the carrier. A "machine-readable medium" may include any medium that can store or transfer information.

What is claimed is:

1. A battery heating system, comprising:
a temperature sampling module configured to sample a target sampling temperature, wherein the target sampling temperature comprises a real-time temperature of a battery module set or a real-time temperature of an external environment of a battery pack to which the battery module set belongs, the battery module set comprises N battery modules, and N is a positive integer;
a control module configured to control a heating module to enter a first heating mode when the target sampling temperature is not lower than a preset expected heating temperature;
the heating module configured to intermittently heat the battery module set in the first heating mode by using external electric energy provided by an external charging device in the battery heating system,
wherein the control module is configured to:
control the heating module to enter a second heating mode if the target sampling temperature is lower than a preset initial charging temperature, wherein the preset initial charging temperature is lower than the preset expected heating temperature, and the second heating mode comprises using the external electric energy to continuously heat the battery module set;
determine whether the target sampling temperature is lower than the preset expected heating temperature after a preset first time period has elapsed since the heating module is controlled to enter the second heating mode;
control the heating module to enter the first heating mode if the target sampling temperature is not lower than the preset expected heating temperature, and
wherein the control module is further configured to:
control the external charging device to enter a third working mode if the target sampling temperature is not lower than the preset initial charging temperature, wherein the third working mode comprises using the external electric energy to charge the battery module set;
determine whether the target sampling temperature is lower than the preset expected heating temperature after the preset first time period has elapsed since the external charging device is controlled to enter the third working mode;
control the heating module to enter the first heating mode if the target sampling temperature is not lower than the preset expected heating temperature.

2. The battery heating system according to claim 1, wherein one terminal of the external charging device is respectively connected to one terminal of the battery module set and one terminal of the heating module, and another terminal of the external charging device is respectively connected to another terminal of the battery module set and another terminal of the heating module;

the external charging device is configured to enter a first working mode to provide a first portion of the external electric energy to the heating module and to use a second portion of the external electric energy to charge the battery module set, or enter a second working mode to provide the external electric energy to the heating module;

the control module is further configured to control the external charging device to enter the first working mode when the target sampling temperature is not lower than the preset expected heating temperature, and control the external charging device to enter the second working mode when the target sampling temperature is lower than the preset expected heating temperature.

3. The battery heating system according to claim 2, wherein the battery heating system further comprises:
a first switch disposed between the one terminal of the external charging device and the one terminal of the heating module, and wherein the control module is configured to control the first switch to be turned on or off, so as to intermittently provide the external electric energy to the heating module.

4. The battery heating system according to claim 1, wherein the control module is further configured to:
control the heating module to maintain the second heating mode if the target sampling temperature is lower than the preset expected heating temperature, and determine, every time the preset first time period has elapsed since the heating module is controlled to maintain the second heating mode, whether the target sampling temperature is lower than the preset expected heating temperature, until the target sampling temperature is not lower than the preset expected heating temperature.

5. The battery heating system according to claim 4, wherein the control module is further configured to:
determine whether a time difference between a current time and a time when the heating module is controlled to enter the second heating mode is greater than a preset second time period,
determine that the heating of the battery heating system is time out if the time difference is greater than the preset second time period.

6. The battery heating system according to claim 1, wherein the control module is further configured to:
after the heating module is controlled to enter the first heating mode, determine, every time a preset third time period has elapsed, whether the external charging device has finished charging the battery module set;
control the heating module to stop heating the battery module set if it is determined that the external charging device has finished the charging of the battery module set.

7. The battery heating system according to claim 1, wherein the control module is further configured to:
determine a heating duration and a stop heating duration according to the target sampling temperature;
control the heating module to enter the first heating mode based on the heating duration and the stop heating duration to intermittently heat the battery module set, wherein the heating duration is a duration during which the control module is to control the heating module to heat the battery module set, and the stop heating duration is a duration during which the control module is to control the heating module to stop heating the battery module set.

8. The battery heating system according to claim 7, wherein the control module is specifically configured to:

determine a difference between the target sampling temperature and the preset expected heating temperature as an actual temperature deviation;
determine the heating duration and the stop heating duration according to the actual temperature deviation and a proportion-integral-derivative (PID) algorithm.

9. A battery heating method applied to the battery heating system of claim 1, wherein the battery heating method comprises:
receiving the target sampling temperature sampled by the temperature sampling module;
controlling the heating module to enter the first heating mode when the target sampling temperature is not lower than the preset expected heating temperature, wherein the first heating mode comprises intermittently heating the battery module set by using the external electric energy provided by the external charging device in the battery heating system;
wherein controlling the heating module to enter the first heating mode when the target sampling temperature is not lower than the preset expected heating temperature comprises:
controlling the heating module to enter a second heating mode if the target sampling temperature is lower than a preset initial charging temperature, wherein the preset initial charging temperature is lower than the preset expected heating temperature, and the second heating mode comprises using the external electric energy to continuously heat the battery module set;
determining whether the target sampling temperature is lower than the preset expected heating temperature after a preset first time period has elapsed since the heating module is controlled to enter the second heating mode;
controlling the heating module to enter the first heating mode if the target sampling temperature is not lower than the preset expected heating temperature;
wherein the battery heating method further comprises:
controlling the external charging device to enter a third working mode if the target sampling temperature is not lower than the initial charging temperature, wherein the third working mode comprises using the external electric energy to charge the battery module set;
determining whether the target sampling temperature is lower than the preset expected heating temperature after the preset first time period has elapsed since the external charging device is controlled to enter the third working mode;
controlling the heating module to enter the first heating mode if the target sampling temperature is not lower than the preset expected heating temperature.

10. The battery heating method according to claim 9, wherein after receiving the target sampling temperature collected by the temperature sampling module, the battery heating method further comprises:
controlling an external charging device to enter a first working mode when the target sampling temperature is not lower than the preset expected heating temperature, wherein the first working mode comprises providing a first portion of the external electrical energy to the heating module and using a second portion of the external electric energy to charge the battery module set;
controlling the external charging device to enter a second working mode when the target sampling temperature is lower than the preset expected heating temperature, wherein the second working mode comprises providing the external electric energy to the heating module.

11. The battery heating method according to claim 10, wherein after determining whether the target sampling temperature is lower than the preset expected heating temperature, the battery heating method further comprises:
controlling the heating module to maintain the second heating mode if the target sampling temperature is lower than the preset expected heating temperature;
determining, every time the preset first time period has elapsed since the heating module is controlled to maintain the second heating mode, whether the target sampling temperature is lower than the preset expected heating temperature, until the target sampling temperature is not lower than the preset expected heating temperature.

12. The battery heating method according to claim 11, wherein the battery heating method further comprises:
determining whether a time difference between a current time and a time when the heating module is controlled to enter the second heating mode is greater than a preset second time period,
determining that the heating of the battery heating system is time out if the time difference is greater than the preset second time period.

13. The battery heating method according to claim 10, wherein the battery heating method further comprises:
after the heating module is controlled to enter the first heating mode, determining, every time a preset third time period has elapsed, whether the external charging device has finished charging of the battery module set;
controlling the heating module to stop heating the battery module set if it is determined that the external charging device has finished the charging of the battery module set.

* * * * *